Jan. 18, 1955     T. R. JUETTNER     2,699,842
MEASURING VALVE
Filed Feb. 27, 1951     2 Sheets-Sheet 2
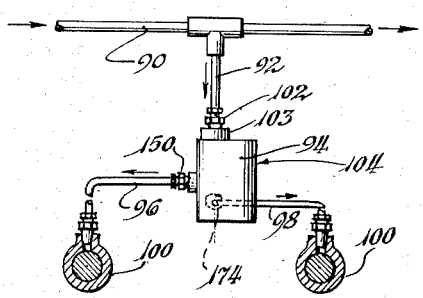
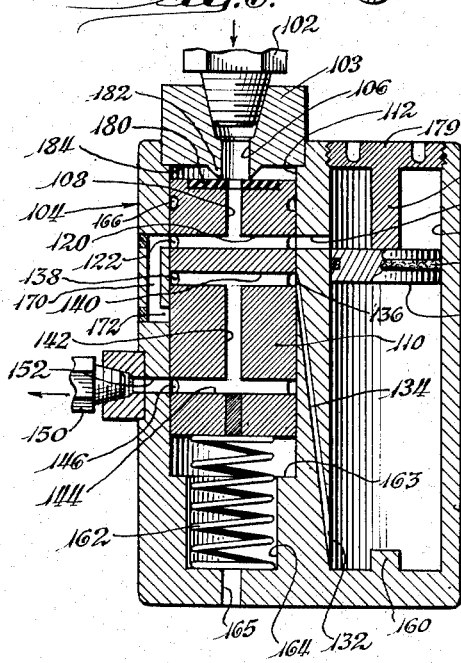
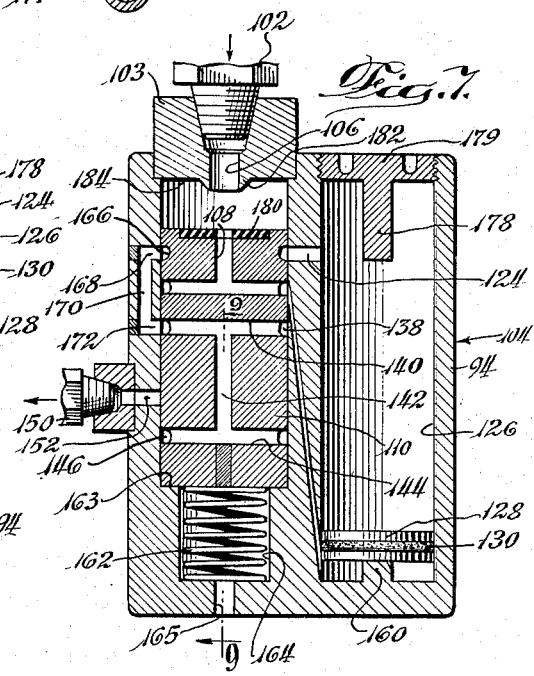
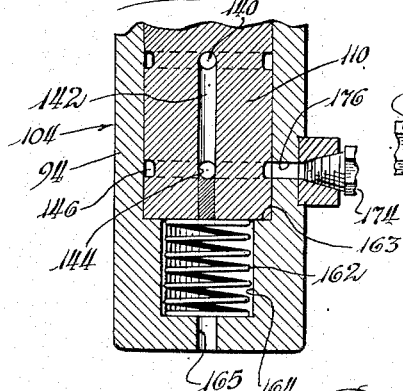
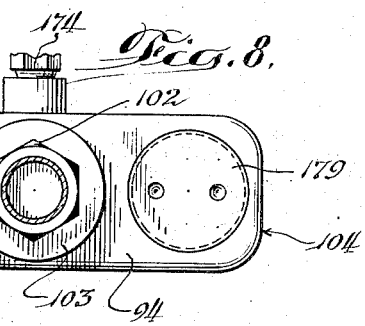
Inventor:
Thomas R. Juettner
By Hinkle, Horton, Ahlberg & Wupper,
Attorneys.

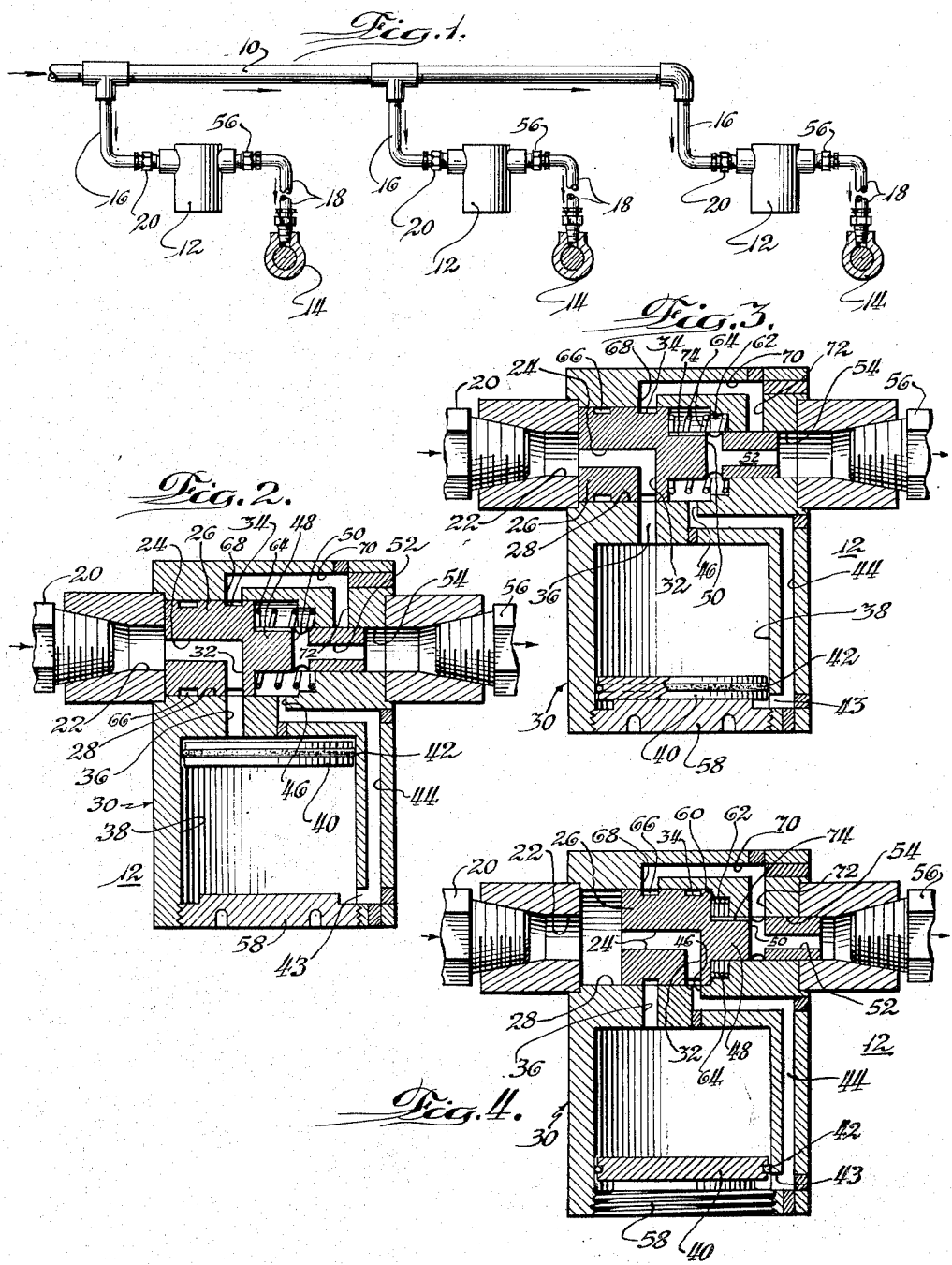

United States Patent Office 2,699,842
Patented Jan. 18, 1955

2,699,842

MEASURING VALVE

Thomas R. Juettner, Evanston, Ill., assignor to Stewart-Warner Corporation, Chicago, Ill., a corporation of Virginia Application February 27, 1951, Serial No. 213,021

9 Claims. (Cl. 184—7)

This invention relates to centralized lubricating systems for lubricating a number of bearings from a central point. The invention relates particularly to the type of system in which a single lubricant line is alternately supplied with lubricant at a high pressure at one point and then vented to relieve the pressure. The invention relates in particular to improved measuring devices for delivering predetermined charges of lubricant to the bearings during each cycle of operation of the system.

An object of the invention is to provide an improved type of measuring valve having a free measuring piston without a piston return spring or a piston rod extending into the atmosphere.

A further object is to provide an improved type of measuring device having a valve operable by lubricant pressure to direct lubricant so as to reciprocate a measuring piston through a complete cycle.

A further object is to provide an improved type of measuring valve capable of lubricating two devices in one cycle of operation of the centralized lubricating system.

A further object is to provide an improved type of measuring device in which a measuring piston completes both its forward and return strokes when the inlet lubricant pressure is high.

A further object is to provide an improved type of measuring valve in which a measuring piston ejects lubricant during both its forward and return strokes which are completed by a single application of pressure to the valve.

A further object is to provide an improved type of measuring valve which is particularly compact.

A further object is to provide measuring valves which are particularly simple, economical and reliable.

Further objects, advantages and features of the invention will become apparent from the following description of illustrative embodiments, taken with the drawings, in which:

Fig. 1 shows diagrammatically some of the components of a centralized lubricating system constructed in accordance with the invention;

Fig. 2 is a large scale central vertical sectional view of an improved measuring valve forming a part of the system, the valve being in its normal or initial condition;

Fig. 3 is a view similar to Fig. 2 showing the measuring valve at a point in its cycle of operation when the measuring piston has just completed its downward discharge stroke;

Fig. 4 is a similar view showing the measuring device after its control valve has shifted in preparation for the return discharge stroke of the piston;

Fig. 5 illustrates components of a modified centralized lubricating system constructed in accordance with the invention;

Fig. 6 is a large scale central vertical sectional view of a modified measuring device forming a part of the system of Fig. 5, the parts of the device being shown in their normal initial positions;

Fig. 7 is a similar view illustrating the measuring device of Fig. 6 at a point in its operating cycle in which the measuring piston has completed its downward discharge stroke and the control valve has shifted in preparation for the upward return stroke of the piston;

Fig. 8 is a top plan view of the modified measuring device; and

Fig. 9 is a fragmentary vertical sectional view taken as indicated by the line 9—9 in Fig. 7.

The centralized lubricating system of Fig. 1 has a lubricant carrying line 10 which is adapted to be supplied with lubricant under a high pressure by a lubricant source, not shown. The lubricant pressure in the line 10 operates a plurality of measuring devices 12 to supply predetermined charges of lubricant to respective devices 14 requiring lubrication, the devices being illustrated as bearings. The measuring devices are connected to the line 10 by means of branch conduits 16 and to the bearings by means of conduits 18.

After the measuring devices have had time to deliver their charges, the lubricant pressure on the line is relieved, by venting the line to the atmosphere, for example. The measuring devices 12 then condition themselves for another lubricating cycle which is initiated when the pressure is again applied to the line 10.

In Fig. 2 the lubricant under pressure enters the measuring device 12 through an inlet fitting 20 which is connected with one of the branch conduits 16. The lubricant passes through a bore 22 and thence into an axial passageway 24 in a valve slider 26 which is reciprocable in a horizontal cylindrical opening 28 formed in a body member 30. The lubricant then passes into a radial passageway 32 in the slider which communicates with an annular groove 34 in the periphery of the slider. The lubricant then passes downwardly through a passageway 36 which registers with the annular groove 34 when the slider is in its normal position as shown in Fig. 2. The lubricant thereby enters a vertical measuring cylinder or chamber 38 at a point above a freely movable measuring piston 40 positioned in the cylinder and separating it into upper and lower compartments. A packing ring 42 is interposed between the piston and the cylinder.

The pressure of the lubricant forces the piston downwardly and displaces a charge of lubricant below the piston in the cylinder, the cylinder having been charged during a previous cycle of operation of the measuring device. The lubricant below the piston is forced through a port 43 below the piston and upwardly through a passageway 44 in the body 30 into the cylindrical valve opening 28 through a port 46. The port 46 registers with a portion of the slider 26 which is reduced in diameter to form a stem 48. The lubricant flows out of the port 46, into the space between the cylindrical wall of the opening 28 and the stem, into a radial passage 50 extending through the stem, and through an axial passage 52 into a bore 54 in the body 30. The stem 48 is slidably positioned in the bore 54. The lubricant passes from the bore 54 into an outlet fitting 56 which is connected to one of the conduits 18 leading to a device to be lubricated.

At the end of its downward stroke the piston is arrested by engagement with a threaded cover 58 which closes the lower end of the measuring cylinder 38, as shown in Fig. 3. Since movement of lubricant into the measuring cylinder 38 is thus arrested, the lubricant pressure rapidly builds up in the measuring cylinder and the inlet bore 22. When the pressure has reached a predetermined critical value substantially greater than the normal resistance offered by the device to be lubricated, the differential fluid pressure on the slider, which then exceeds a predetermined force, moves the latter to the right, as shown in Fig. 4, until the slider abuts against a shoulder 60 formed by a bore 62 of reduced diameter at the right end of the cylindrical opening 28. The movement of the valve slider compresses a spring 64 coiled around the stem 48 and acting between the slider and the right hand end of the bore 62.

In this position of the valve member the annular groove 34, which is in communication with the inlet fitting, registers with the port 46 so that lubricant passes downwardly through the passageway 44 into the measuring cylinder through the port 43 below the piston 40. The piston is forced upwardly to displace the lubricant in the measuring cylinder above the piston. The displaced lubricant passes outwardly through the passage 36 which now registers with an annular groove 66 in the outer periphery of the valve slider 26. The lubricant passes through the groove into a port 68 in the body which registers therewith and thence into a passage 70. Then the lubricant passes through a port 72 which now registers with the radial passage 50 in the stem 48 so that lubricant from above the piston can pass through the axial passage 52 into the outlet fitting 56.

At the end of its upward discharge stroke the piston 40 is arrested by engagement with the upper end of the measuring cylinder 38. Lubricant pressure holds the valve slider 26 in its rightward position as shown in Fig. 4 until the pressure in the line is relieved. Then the spring 64 returns the valve slider to its normal position, as shown in Fig. 2, to condition the measuring device for another lubricating cycle.

It will be seen that the piston 40 is moved through both its forward and return strokes during the time when the pressure in the line 10 is high. Consequently, positive operation of the piston is assured. Since the piston empties the measuring cylinder 38 twice during the cycle of operation, the measuring device may have an unusually small over-all size. Moreover, the operation of the slide valve member displaces a small charge of lubricant positioned between the cylindrical opening 28 and the stem. This charge is discharged into the radial passage 50 in the stem through a passage formed by a flat 74 on the portion of the stem to the left of the radial passage.

It will be seen that the pressure in the outlet bore 54 is applied to the valve slider 26 in opposition to the pressure in the inlet bore 22. When the slider 26 is in its starting position, Fig. 2, a sizeable area of the hydraulic valve actuator formed by the left end of the piston is shielded from the inlet pressure by masking means formed by the structure which defines the inlet bore 22. This arrangement tends to prevent premature shifting of the slider from its normal position to the position which produces reverse flow of lubricant through the measuring cylinder 38. This arrangement is particularly advantageous for supplying bearings having relatively high resistance to lubricant flow.

When the valve slider 26 is in its normal position, Figs. 2 and 3, and lubricant is being supplied to the measuring device, shifting movement of the valve slider to the right in relation to the drawing is opposed by the spring 64 and the differential end areas of the slider acted upon by the lubricant. As shown in Fig. 2, the lubricant on the discharge side of the device applies pressure over the entire area of the slider whereas on the inlet side only a portion of the area of the slider is exposed to the lubricant. Therefore, when the measuring piston 40 reaches the limit of its downward stroke, the lubricant pressure build-up must be substantial before the valve slider will crack or move slightly. Immediately upon cracking of the slider, the entire area thereof is exposed to the lubricant pressure and, in view of the increased area and pressure, the slider will snap with a poppet valve action to the limit of its movement as defined by the shoulder 60. When the valve slider engages the shoulder 60, a portion of its area is covered and therefore the exposed area on the inlet side is greater than that on the discharge side, as shown in Fig. 4. This differential of area must be such, when correlated to the inlet and discharge pressure, which must be considered to be equal, as to have a pressure effect on the slider substantially in excess of that of the spring 64 so as to maintain the slider in the position to which it has been moved until relief of pressure upon venting the lubricant line. Were not this relationship maintained the valve slider 26 would flutter from position to position, or between positions and result in continuous lubricant discharge rather than the measured shot discharge desired. The necessary differentials in area required for a given size slider are readily calculated by one acquainted in the art.

The modified lubricating system of Fig. 5 has a lubricant line 90 connected by branch conduits 92 with modified measuring valves 94, one of which is illustrated. When lubricant pressure is applied to the line, each of the measuring valves 94 supplies measured charges of lubricant through conduits 96 and 98 to a pair of bearings 100.

In Fig. 6, lubricant under pressure enters the measuring valve 94 through an inlet fitting 102 mounted on a bushing 103 at the top of a valve body 104. The lubricant passes downwardly through an axial inlet bore 106 in the bushing into an axial passageway 108 in a valve slider 110 reciprocable in a valve cylinder 112 formed in the body 104. The bushing closes the upper end of the cylinder 112.

Then the lubricant passes through a diametral passageway 120 in the slider into an annular groove 122 in the periphery thereof and thence through a horizontal body passageway 124 into a measuring cylinder 126 above a piston 128 positioned therein. A packing ring 130 is positioned in an annular groove in the periphery of the piston.

The lubricant forces the piston 128 downwardly and thereby displaces a charge of lubricant in the cylinder 126 below the piston, the cylinder having been charged during a previous cycle of operation. The displaced lubricant passes through a port 132 below the piston into an inclined passageway 134 in the body and thence through a port 136 into the valve cylinder 112 at a point below the passageway 124. Lubricant passes into an annular groove 138 in the periphery of the valve slider and thence through a diametral passageway 140, an axial passageway 142 and a second diametral passage 144 into an annular groove 146 in the periphery of the slider. The lubricant then flows into an outlet fitting 150 through a passageway 152 which registers with the groove 146. The outlet fitting 150 is connected to the bearing 100 through the conduit 96.

At the end of its downward stroke, the measuring piston 128 is arrested by engagement with an axial projection 160 at the lower end of the measuring cylinder 126. Since the flow of lubricant into the cylinder is arrested, the pressure in the cylinder and in the inlet bore 106 rapidly increases. This forces the valve slider 110 downwardly against the resistance of a helical spring 162 acting between the body 104 and the lower end of the slider. The slider moves to the position shown in Fig. 7 in which its lower end engages an annular shoulder 163. The spring 162 is housed in a bore 164 which is vented to the atmosphere by a passageway 165.

In this position of the slider the lubricant flows from the inlet bore 106 into the upper end of the valve cylinder 110 and thence through the axial passage 108 in the slider, the diametral passage 120, the annular groove 122, and the inclined passageway 134, into the measuring cylinder 126 below the piston 128. The piston 128 is forced upwardly to displace the lubricant in the cylinder above the piston. The displaced lubricant flows through the passageway 124 into an annular groove 166 in the outer periphery of the valve slider 110, and thence through a port 168 into a downward passageway 170 in the body 104. Lubricant then flows out through a port 172 into the annular groove 138 and thence through the passageways 140, 142 and 144 into the annular groove 146.

As shown in Fig. 9, the lubricant flows into an outlet fitting 174 through a passageway 176 which now registers with the groove 146. The outlet fitting 174 is connected to a second bearing 100 by the conduit 98. As shown in Fig. 8, the outlet fittings 150 and 174 protrude from the body of the measuring valve at right angles.

At the end of its upward return stroke, the piston is arrested by engagement with a downwardly extending axial projection 178 forming a part of a threaded cover 179 closing the upper end of the measuring cylinder 126. The piston remains in this position and the slider remains in its shifted position shown in Fig. 7 until the inlet lubricant pressure is relieved. Then the spring 162 returns the slider to its initial position shown in Fig. 6 to condition the measuring device for another cycle of operation. The piston 128 remains in its upper position in engagement with the projection 178 until lubricant under pressure is again applied to the inlet fitting 102.

In the modified form of the measuring valve the slider 110 is in equilibrium with respect to the pressures in the outlet fittings 150 and 174. Consequently the spring 162 provides the only effective resistance to the movement of the slider from its normal position to the position which produces reverse flow of lubricant through the measuring cylinder. Consequently, the modified measuring device should preferably be used to lubricate bearings having relatively low resistance, in order to avoid premature shifting of the slider before the piston completes its downward stroke.

In the initial position of the slider a washer-like insert 180 mounted at the upper end of the slider 110 seats against a conical projection 182 extending downwardly from the upper wall 184 of the valve cylinder 112. This arrangement prevents lubricant from flowing out of the inlet bore 106 directly into the upper end of the measuring cylinder 112. Thus the inlet lubricant pressure acts against only a portion of the upper face of the slider. This arrangement enables a relatively weak spring to be used.

When the lubricant pressure builds up sufficiently to start shifting the slider 110, the insert 180 is unseated from the projection 182 and the inlet lubricant pressure is thereafter applied to the entire upper face of the slider. Consequently, the slider tends to complete its shifting movement with a snap action. Moreover, the slider remains in its shifted position until the inlet pressure is reduced substantially below the value which was required to shift the slider.

In both embodiments of the invention, a spring retains the slider valve in a first setting or position while the measuring piston (40, 128) executes the first stroke of its cycle. The slider is moved to a second position for the measuring piston to execute the return stroke of its cycle. In the form of the invention shown in Figs. 1 to 4, the measuring piston operates through a complete cycle upon each application of lubricant pressure to the system, and thus twice the effective displacement of the measuring cylinder is supplied to a single bearing. In the form of the invention shown in Figs. 5 to 9, the slider has the additional function of alternating the discharge between the two outlet fittings. It will be clear that the slider return spring in each embodiment of the invention applies sufficient force to hold the slider in its first setting or position during the first stroke of the measuring piston. Until this first piston stroke is completed the fluid pressure which tends to produce shifting movement of the valve does not greatly exceed the normal resistance to the outflow of fluid from the device. However, as soon as the piston movement is terminated at the end of the first stroke, the fluid pressure at the inlet immediately builds up to a value which may greatly exceed the resistance to the outflow of lubricant from the device. This high inlet pressure then forces the valve slider to its "second setting" (e. g., the position assumed by the valve slider 26, Fig. 4, and that assumed by the slider 110 in Fig. 7).

As indicated by the following claims, the essentials of the invention may be practiced without strict adherence to all of the details of the apparatus described above to explain and illustrate the invention.

I claim:

1. In a measuring device for delivering individual charges of lubricant, the combination of piston cylinder means, a piston reciprocable therein, first and second passage means communicating with the cylinder means on opposite sides of the piston, valve cylinder means, a valve slider reciprocable therein between first and second positions, yieldable means urging the slider toward its first position, inlet passage means communicating with the valve cylinder means on one side of the slider to apply inlet lubricant pressure to the slider to urge the latter toward its second position, said yieldable means having sufficient strength to hold the slider in its first position while the lubricant in the inlet passage remains below a critical operating pressure substantially greater than the normal resistance to the outflow of fluid from the device and to yield only when the pressure in the inlet passage exceeds said critical operating pressure, the valve cylinder means and the slider having respective cooperating means to connect the inlet means to the first passage means and to discharge lubricant through the second passage means when the slider is in its first position and to connect the inlet means to the second passage means and to discharge lubricant through the first passage means when the slider is in its second position.

2. In a measuring device for delivering individual charges of lubricant, the combination of piston cylinder means, a piston reciprocable therein, first and second passage means communicating with the cylinder means on opposite sides of the piston, valve cylinder means, a valve slider reciprocable therein between first and second positions, yieldable means urging the slider toward its first position, lubricant inlet passage means communicating with the valve cylinder means on one side of the slider to apply inlet lubricant pressure to the slider to urge the latter toward its second position, said yieldable means being of sufficient strength to hold the slider in its first position while the lubricant in the inlet passage is below a critical operating pressure substantially greater than the normal resistance to the outflow of lubricant from said device and to yield only when the pressure in the inlet passage exceeds said critical operating pressure, lubricant outlet passage means communicating with the valve cylinder means on the opposite side of the slider to apply outlet lubricant pressure to the slider to urge the latter toward its first position, the valve cylinder means and the slider having respective cooperating means to connect the inlet means to the first passage means and the second passage means to the outlet means when the slider is in its first position and to connect the inlet means to the second passage means and the first passage means to the outlet means when the slider is in its second position.

3. In a measuring device for delivering individual charges of lubricant, the combination of piston cylinder means, a piston reciprocable therein, first and second passage means communicating with the cylinder means on opposite sides of the piston, lubricant outlet passage means, lubricant inlet passage means, valve cylinder means, a valve slider reciprocable therein between first and second positions, the valve cylinder means and the slider having respective cooperating means to connect the inlet means to the first passage means and the second passage means to the outlet means when the slider is in its first position and to connect the inlet means to the second passage means and the first passage means to the outlet means when the slider is in its second position, yieldable means urging the slider toward its first position, means on the slider positioned to be acted upon by lubricant pressure in the inlet passage means for shifting the slider to its second position, said yieldable means being of sufficient strength to hold the slider in its first position when the lubricant in the inlet passage is below a critical operating pressure having a value substantially in excess of the normal resistance to the outflow of fluid from the device and yielding only when the pressure in the inlet exceeds said critical operating pressure.

4. In a measuring device for delivering individual charges of lubricant, the combination of piston-cylinder means, a piston reciprocable therein, first and second passage means communicating with the cylinder means on opposite sides of the piston, lubricant outlet passage means, lubricant inlet passage means, a reversing valve connected with the first and second passage means and the inlet and outlet passage means, spring means urging the valve to a first setting upon the relief of fluid pressure at said inlet means to connect the inlet means with the first passage means and the second passage means with the outlet means for effecting a first stroke of said piston, means for mechanically terminating movement of said piston at the end of a first stroke thereof, the valve having a second setting to connect the inlet means with the second passage means and the first passage means with the outlet means for effecting a second stroke of said piston, and means mechanically independent of said piston exposed to the lubricant pressure in the inlet means for shifting the valve to its second setting as an incident to the build-up of said inlet pressure immediately following said termination of said piston movement.

5. For use in a centralized lubricating system, a lubricant measuring device capable of passing only two measured charges of lubricant upon each application thereto of lubricant under pressure, said device comprising, in combination, means defining a fluid chamber, shiftable separating means dividing said chamber into two compartments, means defining an inlet for lubricant under pressure, means defining a lubricant outlet from said device, means including a shiftable valve for connecting said inlet to either of said compartments while connecting the other compartment to said outlet, means operable as an incident to the increase in fluid pressure at said inlet upon filling of a first one of said compartments to capacity to shift said valve to charge fluid into the second compartment and to discharge fluid from said first compartment, and means operable as an incident to the relieving of fluid pressure at said inlet to shift said valve back to starting position to again connect said inlet with said first compartment in preparation for the next cycle of operation.

6. A two-stroke lubricant measuring device comprising, in combination, a cylinder, a piston slidable in said cylinder, means defining an inlet for lubricant under pressure, means defining an outlet from said device, means including a shiftable valve for connecting said inlet with either end of said cylinder while connecting the other end of said cylinder to said outlet, means normally operable only as an incident to the relieving of fluid pressure at said inlet to move said valve means to a starting position to connect a first end of said cylinder with said inlet and the second end of the cylinder with said outlet in preparation for a first stroke of said piston, and hydraulic valve actuating means exposed to the fluid pressure at said inlet and operable by the build-up of said pressure to a predetermined critical value as an incident to the completion of a first stroke by said piston to shift said valve to direct fluid only to the second end of said cylinder to produce a second stroke of said piston, said valve and said piston serving to terminate the flow of lubricant through said device upon the completion of the second piston stroke.

7. For use in a centralized lubricating system, a two-stroke lubricant measuring device comprising, in combination, means defining a fluid chamber, shiftable separating means dividing said chamber into two compartments, means defining an inlet for lubricant under pressure, means defining two lubricant outlets for said respective compartments, means including a shiftable valve for connecting said inlet with either of said compartments while connecting the other of said compartments with the outlet therefor, means normally operable only as an incident to the relieving of fluid pressure at said inlet to condition said valve means for directing fluid into the first of said compartments and for connecting the second of said compartments to the outlet therefor, and means operable as an incident to the increase in fluid pressure at said inlet after movement of said separating means to one extreme position by the inflow of fluid into said first compartment to shift said valve means to connect said inlet with only said second compartment and to connect said first compartment with the outlet therefor.

8. For use in a centralized lubricating system, a lubricant measuring device capable of passing only two measured charges of lubricant upon each application thereto of lubricant under pressure, said device comprising, in combination, means defining a fluid chamber, shiftable separating means dividing said chamber into two compartments, means defining an inlet for lubricant under pressure, means defining an outlet from said device, means including a shiftable valve for connecting said inlet to either of said compartments while connecting the other compartment to said outlet, biasing means urging said valve means to a starting position to connect a first of said compartments with said inlet and the second compartment to said outlet, means for terminating shifting movement of said separating means when said one compartment has been filled to capacity with lubricant, pressure responsive valve actuating means exposed to the fluid pressure at said inlet and operable as an incident to the build-up of said pressure upon said termination of shifting movement of said separating means to move said valve only to a second stroke position in which said second compartment is connected to said inlet and said first compartment is connected to said outlet, and said biasing means being free to return said valve to said starting position as an incident to the relieving of fluid pressure at said inlet.

9. For use in a centralized lubricating system, a lubricant measuring device comprising, in combination, means defining a fluid chamber, shiftable separating means dividing said chamber into two compartments, means defining an inlet for lubricant under pressure, means defining a lubricant outlet from said device, means including a shiftable valve for connecting said inlet with either of said compartments while connecting the other compartment with said outlet, biasing means urging said valve to a starting position for connecting a first one of said chambers to said inlet and the second chamber to said outlet, means for terminating shifting movement of said separating means when said first compartment has been filled with lubricant under pressure, valve actuating means exposed to the lubricant pressure at said inlet and operable by the build-up of said pressure incident to said termination of movement of said separating means to move said valve to a second stroke position in which said second compartment is connected to said inlet and said first compartment is connected to said outlet, said biasing means being operable as an incident to the subsequent relieving of pressure at said inlet to return said valve to said starting position, and masking means positioned to shield a portion of said actuating means when the latter is in said starting position whereby only a portion of the total effective area thereof is exposed to the lubricant pressure at said inlet until valve shifting movement is under way.

References Cited in the file of this patent

UNITED STATES PATENTS

| | | |
|---|---|---|
| 1,464,676 | Harrington | Aug. 14, 1923 |
| 1,870,188 | Abrams | Aug. 2, 1932 |
| 1,963,663 | Kerns | June 19, 1934 |
| 2,459,010 | Williams | Jan. 11, 1949 |